United States Patent [19]
Brown et al.

[11] Patent Number: 5,235,613
[45] Date of Patent: Aug. 10, 1993

[54] FREQUENCY HOPPING METHOD AND APPARATUS

[75] Inventors: David K. Brown; John H. Nitardy, both of Seattle; Ken Y. Ogami, Bothell, all of Wash.

[73] Assignee: The Boeing Company, Seattle, Wash.

[21] Appl. No.: 844,712

[22] Filed: Mar. 2, 1992

[51] Int. Cl.$^5$ .............................................. H04K 1/00
[52] U.S. Cl. ...................................................... 375/1
[58] Field of Search ................................. 375/1; 328/14

[56] References Cited

U.S. PATENT DOCUMENTS

| | | | |
|---|---|---|---|
| 4,023,103 | 5/1977 | Malm | 375/1 |
| 4,103,250 | 7/1978 | Jackson | 375/1 |
| 4,271,524 | 7/1981 | Goodman et al. | 375/1 |
| 4,616,364 | 10/1986 | Lee | 375/1 |
| 4,704,585 | 11/1987 | Lind | 375/1 |
| 4,791,377 | 12/1988 | Granfield et al. | 328/14 |
| 4,951,237 | 8/1990 | Essenwanger et al. | 328/14 |

Primary Examiner—Salvatore Cangialosi
Attorney, Agent, or Firm—Christensen, O'Connor, Johnson & Kindness

[57] ABSTRACT

Disclosed is a frequency mapping system (10) including a data processor (12) and a control word memory (16) to be used with a pseudo-random (PN) number generator (32) and a frequency synthesizer (34). The processor receives an input that specifies those frequencies in a frequency band that are available for communications, associates each specified frequency with a respective control word that designates a carrier frequency to the frequency synthesizer, and stores the control words corresponding to the specified frequencies in the control word memory. Once the control word memory is mapped, the PN generator produces code words that address locations in the control word memory whereby the control words in the addressed locations are sent to the frequency synthesizer.

18 Claims, 7 Drawing Sheets

FREQUENCY HOPPING METHOD AND APPARATUS

FIELD OF THE INVENTION

The present invention generally relates to spread spectrum communication systems that utilize frequency hopping and, in particular, to a method and apparatus for mapping frequency hop selections.

BACKGROUND OF THE INVENTION

Spread spectrum modulation techniques are being increasingly used in communications systems to provide protection against unauthorized signal detection, interception and exploitation. Spread spectrum modulation also provides a degree of immunity against both unintentional and deliberately introduced interference, e.g., communications fading and jamming. Spread spectrum systems employ a transmission bandwidth that is substantially greater than that of the information-bearing signal.

One common modulation technique used in spread spectrum communication systems is frequency hopping. In a frequency hopping system, the carrier frequency is shifted or switched in a pattern dictated by a prepared code sequence, for example, by a pseudo-random number sequence. The communications receiver must be tuned or matched to the frequency hopping signal, and thus both the transmitter and receiver generate the same code sequence. The receiver is synchronized with the transmitter, for example, by tuning to a first fixed frequency or by having the pseudo-random number related to or derived from the time of day. Thereafter, the receiver duplicates the frequency hops made by the transmitter using the pseudo-random number sequence.

Spread spectrum communication systems that utilize frequency hopping generally use a frequency synthesizer that generates a single frequency for a given digital control word. The makeup of the control word is commonly based on the frequency divider configuration of the synthesizer, and is therefore unique to the particular communications system being implemented. For example, the size of the frequency control word will be influenced by the range and resolution of the frequencies to be used by the system.

Spread spectrum communication systems have been developed where the prepared code sequence outputs digital numbers that correspond to the control words used by the synthesizer. Thus, in this type of system, there is typically a frequency hop for each number sent to the synthesizer. An important consideration in spread spectrum communication systems is the desire to avoid certain frequencies that fall in the range of the synthesizer. Certain frequencies are avoided for a number of reasons, including government testing, use of emergency channels, fading, jamming and other exploitation. The avoidance of unwanted frequencies has typically been accomplished by inhibiting the control words that would select these frequencies. This type of avoidance scheme is undesirable because, for example, at high hop rates, avoiding frequencies by testing each code word generated may require a code word generator to run at excessively high operation rates and with unpredictable timing characteristics.

SUMMARY OF THE INVENTION

The invention is a frequency hopping communication system that allows a user to select carrier frequencies at which the communication system will operate and thus avoid frequencies that may be unavailable due to the geographical area or time that the communications are to take place. The frequency hopping communication system includes (1) a frequency synthesizer for producing a carrier signal at a frequency specified by a digital control word, (2) a generator for generating a prepared sequence of code words and (3) a controller that is responsive to the sequence of code words and to a selection input indicating the carrier frequencies to be used, for generating a series of digital control words. The controller has a control word memory that includes a plurality of memory locations for storing the digital control words, an address input coupled to receive the prepared sequence of code words from the generator, a data output coupled to provide control words from addressed memory locations to the frequency synthesizer, and a data input for receiving the control words to be stored in the memory locations. The controller also includes a control word supplier for providing control words to the data input of the control word memory, the control word supplier (a) receiving selection data indicating selected carrier frequencies to be generated by the frequency synthesizer and (b) providing the control words corresponding to the selected carrier frequencies to the control word memory.

In accordance with one aspect of the invention, the control word supplier is a data processor that includes an input/output device for receiving an input that specifies carrier frequencies that are available for communications at a particular time and location, associates each specified frequency with its respective control word, and stores the control words corresponding to the specified frequencies in the control word memory.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Spread spectrum communication systems that utilize frequency hopping, that is a pseudo-random variation or hopping of the carrier frequency of the transmitted signal, are generally configured to provide hopping to any given carrier frequency within a predetermined frequency band. One common consideration in spread spectrum communication systems is the desire to avoid certain frequencies that fall within the frequency band. For example, due to operational constraints such as interoperability with other communicators, jamming avoidance, or networking, it is often desirable to avoid communicating on a subset of the carrier frequencies in the frequency band. Moreover, the frequencies to be avoided are often dependent upon the geographical area and time that the communications are to take place.

In accordance with the invention, a frequency mapping system is provided that maps only those frequencies in the frequency band that are available for communication. The frequency mapping system is used in conjunction with a communication system having a prepared code sequence generator, e.g., a pseudo-random number generator, and a frequency synthesizer. Each frequency is associated with a digital control word that indicates to the synthesizer the carrier frequency at which communications are to take place. The frequency selection is accomplished, for example, through a user input at system start-up or by a computer program that responds to known conditions affecting the frequency selection, with the program having the ability to vary the selection if conditions change in the course of communicating. The frequency selection can also be an input that indicates the unavailable frequencies.

Figure 1:
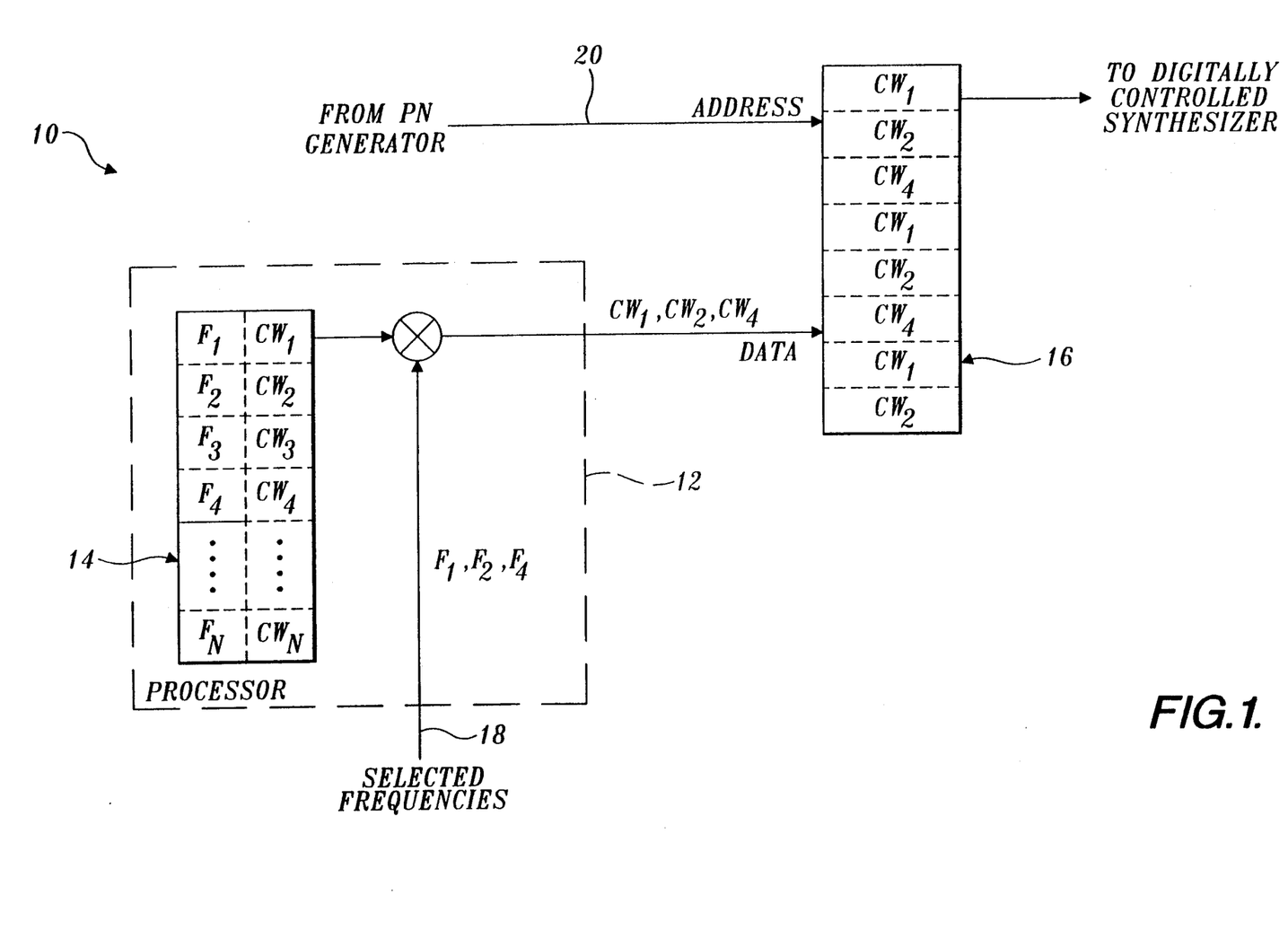
FIG. 1 is a schematic diagram of a frequency mapping system in accordance with the invention.

FIG. 1 is an illustrative example of a frequency mapping system 10 in accordance with the invention. Frequency mapping system 10 includes a data processor 12 (e.g., a microprocessor) having a program or data memory 14, and a control word or frequency code memory 16. The memory 14 contains a listing of each frequency $F_1, F_2, \ldots F_N$ in the frequency band of the communications system along with its associated digital control word $CW_1, CW_2, \ldots CW_N$. The processor 12 accepts an input on line 18 designating a subset of the frequency band that has been selected for communications at any particular area and time. For example, the frequencies $F_1, F_2$ and $F_4$ are shown selected in FIG. 1. The control words from the selected frequencies are mapped into the control word memory 16 by processor 12. As an example, FIG. 1 illustrates mapping the control word memory 16 by repeatedly adding the sequence $CW_1$, $CW_2$ and $CW_4$ until the memory is fully mapped. It is noted that the memory 14 need not actually store the frequencies $F_N$. For example, each frequency $F_N$ could be associated with a particular addressed location holding the control word $CW_N$ for that frequency, e.g., the first memory location holds the control word for $F_1$, the second memory location for the control word $F_2$, and so forth. Thus, in this example the frequencies would be inferentially defined by the addresses in memory 14.

During communication, an address is generated on line 20 by a prepared code sequence generator, e.g., pseudo-random number (PN) generator, whereby the control word contained in the addressed location is sent to a frequency synthesizer. An advantage of using the control word memory 16 is that every address accessed by a PN number generates a valid control word $CW_N$. Another advantage, explored more fully below, is that the number of times any valid control word appears in the control word memory 16 can at most differ by one from the remaining valid control words mapped in the memory. Thus, the control words are mapped as uniformly as possible while still filling the control word memory 16.

Figure 2:
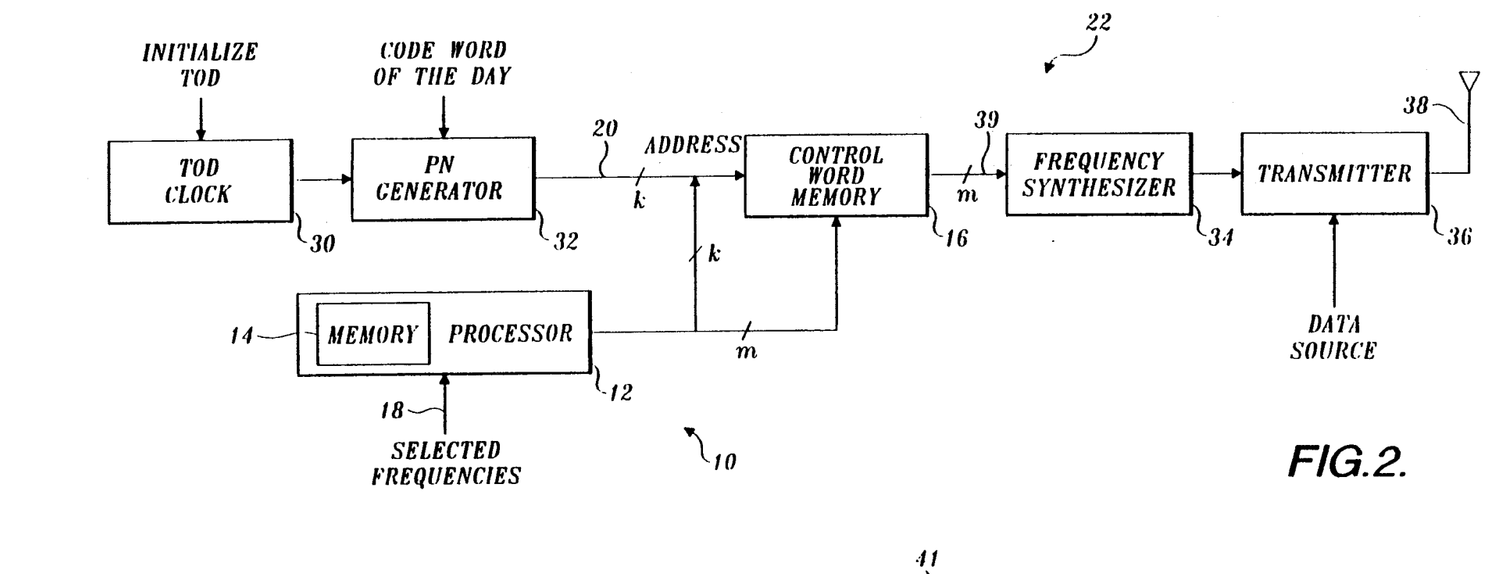
FIG. 2 is a block diagram of a communications transmitter incorporating the frequency mapping system of FIG. 1.

A spread spectrum transmitter that includes the frequency mapping system 10 of FIG. 1 is illustrated in a block diagram in FIG. 2. The communications system 22 includes a time of day (TOD) clock 30, a pseudo-random number (PN) generator 32, a digitally-controlled frequency synthesizer 34, a transmitter 36 and an antenna 38. While the communications system 22 is shown to include a transmitter, the system is adaptable to receive transmitted signals by coupling a suitable receiver to the frequency synthesizer 34. In this manner, bi-directional communications can be realized.

At system start-up, the TOD clock 30 is initialized by accepting time of day and current date inputs. The TOD clock 30 provides a reference for synchronization between a transmitter and receiver utilizing the components of communications system 22. More particularly, a receiver uses the TOD clock 30 to define an offset value that is indicative of the delay between transmission and reception. Using the offset, the receiver establishes a search window in which to look for a series of synchronization pulses from a transmitter. Once communications are established, the offset value is refined and periodically updated to ensure it properly reflects the time required to traverse the distance between the transmitter and receiver. In mobile communication systems, the offset can be adjusted by a Doppler tracking algorithm to account for the changing distance between the transmitter and receiver.

The PN generator 32 accepts (1) a synchronization input from the TOD clock and (2) a code word of the day input. The word of the day is entered by a user, a computer program or through other methods. The word of the day provides a variable that determines the starting point for the generated PN code. At periodic intervals, i.e., for each frequency hop, the PN generator outputs a fixed length digital PN code word to the control word memory 16. Each PN code word correlates to an address in the control word memory 16. The words generated by the PN generator are preferably uniformly distributed, that is that any address in the control word memory is equally likely to be selected at any given frequency hop.

The characteristics of the control word memory 16 take into account (1) the length of the PN code words and (2) the maximum number of frequencies that will be selected at any given time and location. The control word memory should contain at least as many locations as the number of frequencies that may be selected. Moreover, assuming the length of each PN code word to be k bits long, it is convenient to have the number of memory locations (N) be equal to $2^k$. The N memory locations are mapped with the digital control words associated with the selected frequencies using the frequency mapping system 10.

To establish a frequency hop, a PN code word is generated and sent to the control word memory 16. The digital control word held in the location addressed by the PN code word is output on line 39 to the frequency synthesizer 34. The digital control word is assumed to be m bits long. The frequency synthesizer provides the frequency corresponding to the addressed control word to the transmitter 36. Thereafter, data being input to the transmitter 36 by a data source is combined with a carrier signal through any of a number of conventional or spread spectrum modulation techniques and transmitted at the addressed carrier frequency through antenna 38.

In certain situations, such as avoiding jamming or detection, communications performance is enhanced if the frequency selection technique utilized by the communications system does not select the same frequency twice in a row, thus minimizing dwell time at any particular frequency. An identical frequency will be selected by the communications system 22 if (1) the PN generator outputs a PN code word that is the same as the previous code word sent to the control word memory or, alternatively, (2) the current PN code word addresses the same frequency as was addressed by the previous PN code word, even though the PN code words are not identical. For example, with reference to FIG. 1, if two consecutive PN code words were to address the second and last locations in control word memory 16, they would both produce the same control word $CW_2$. In accordance with the invention, a repeat avoidance circuit 40, illustrated in FIG. 3, diminishes the chances that the system will select the same carrier frequency twice in a row.

Figure 3:
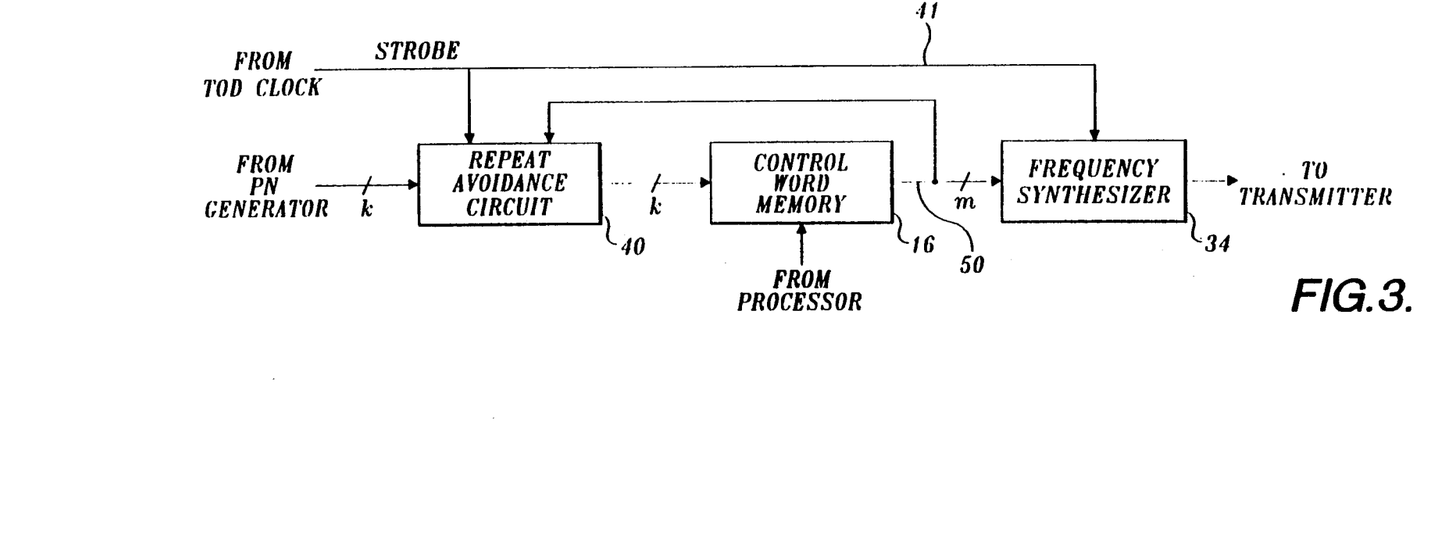
FIG. 3 is a block diagram of the communications transmitter illustrated in FIG. 2, but including a repeat avoidance circuit to diminish the chances of having the same frequency selected on consecutive hops.

With reference to FIG. 3, repeat avoidance circuit 40 is coupled between the PN generator and the control word memory 16. The repeat avoidance circuit accepts an input from the PN generator and initially passes the input unaltered to the control word memory. Thereafter, the repeat avoidance circuit compares the control word addressed by the PN code word with the control word that was most recently sent to the frequency synthesizer. If the comparison indicates that the two control words are equal, a repeat has been detected, and the code word from the PN generator is systematically altered, thereby addressing a new location in the control word memory. The control word addressed by the altered PN code word is then sent to the frequency synthesizer.

The repeat avoidance circuit 40 and frequency synthesizer 34 are coupled to line 41 to receive a strobe signal (STROBE) from the TOD clock. The strobe signal indicates to the frequency synthesizer that control word on line 50 is available. In the preferred arrangement, the strobe is sent at a predetermined frequency hop interval, i.e., the interval of time between each desired hop. This time interval should not be shorter than the settling time of the repeat avoidance circuit 40.

Figure 4:
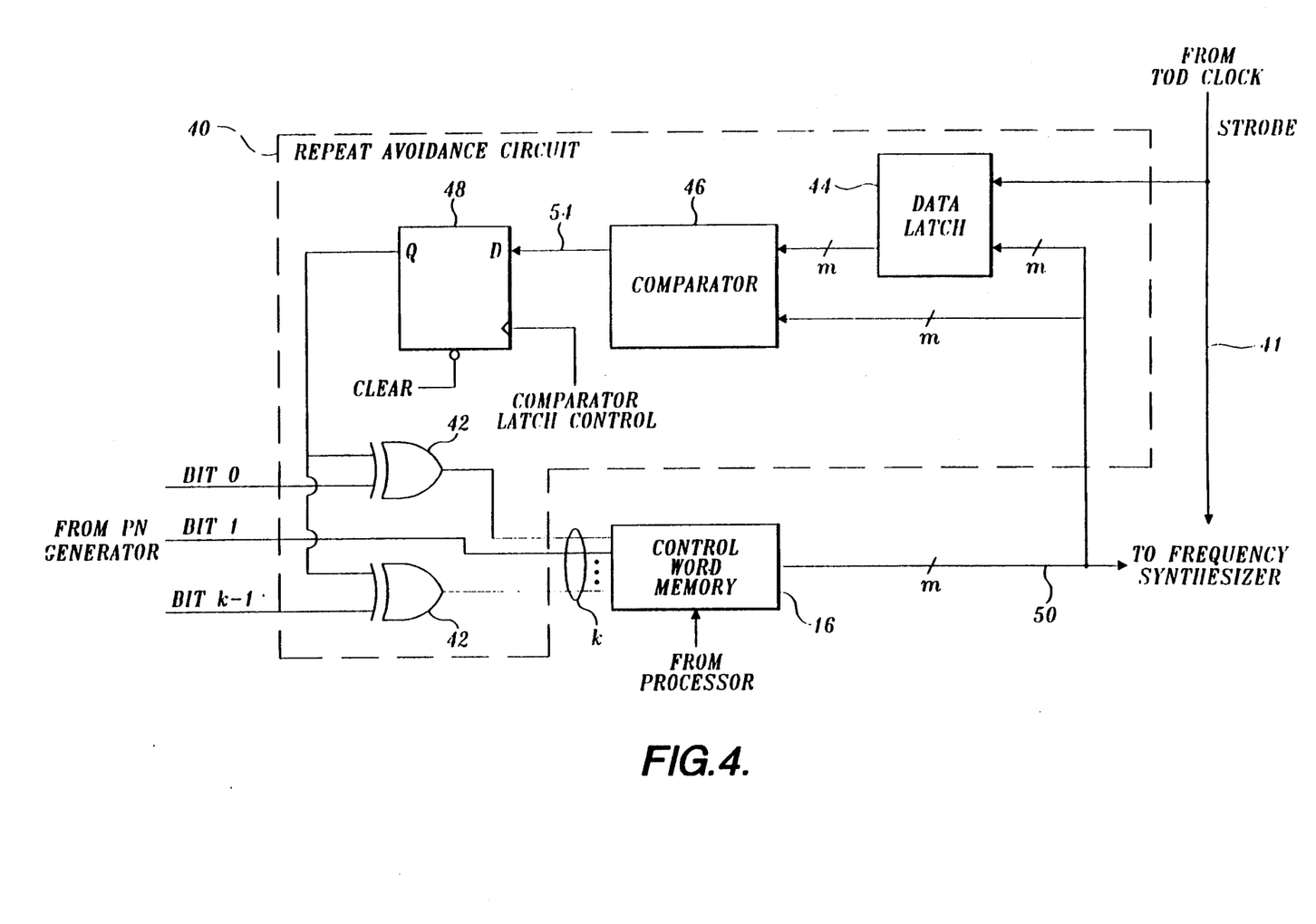
FIG. 4 illustrates an exemplary embodiment of the repeat avoidance circuit shown in block diagram in FIG. 3.

FIG. 4 illustrates an exemplary embodiment of the repeat avoidance circuit 40. Repeat avoidance circuit 40 includes two exclusive-OR gates 42, an m-bit data latch 44, an m-bit comparator 46, and a comparator latch or flip-flop 48. The exclusive-OR gates 42 are coupled between selected bit lines from the PN generator and the input to the control word memory 16. For illustrative purposes, exclusive-OR gates that alter the least significant bit (LSB) and most significant bit (MSB) are shown in FIG. 4. However, it will be appreciated that a single gate is sufficient to alter the PN code word and that any or all bits can be similarly modified. Each exclusive-OR gate is also coupled to the output of the flip-flop 48. The data latch 44 is coupled between the control word memory 16 and comparator 46. Data latch 44 stores the control word that was most recently sent to the frequency synthesizer from control word memory 16.

Comparator 46 compares the control word that was most recently sent to the frequency synthesizer to the currently addressed control word. If the two control words are the same, a repeat has been detected and a logical one is sent to the input D of the flip-flop 48 (line 54). As a result, the output Q of flip-flop 48, which is normally logical zero, becomes a logical one. The logical one output is sent to each of the exclusive-OR gates 42. Those bit lines from the PN generator that have exclusive-OR gates between the PN generator and the control word memory are thus toggled, e.g., the LSB and MSB. The toggling of selected bit lines provides a new PN code word that addresses a different location in the control word memory 16 than was previously addressed, thereby providing a new control word to the repeat avoidance circuit.

Figure 5:
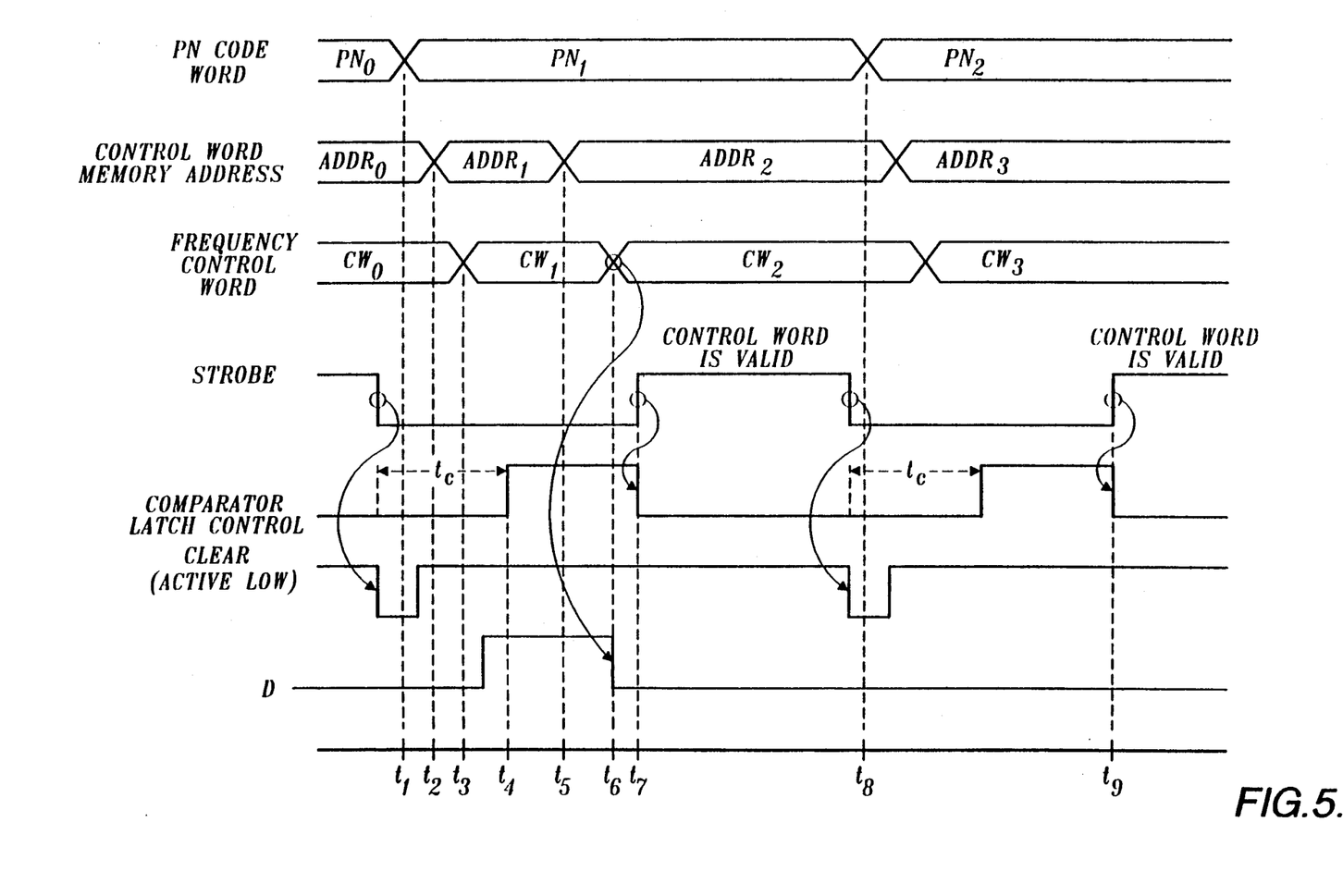
FIG. 5 illustrates the operation of the repeat avoidance circuit shown in FIG. 4.

FIG. 5 illustrates the operation of the repeat avoidance circuit shown in FIG. 4. The PN generator outputs a series of PN code words $PN_0$, $PN_1$, and $PN_2$, shown at the top of FIG. 5. Generation of code word $PN_1$ at time $t_1$ presents an address $ADDR_1$ to the control word memory, shown at time $t_2$. At $t_3$, the control word $CW_1$ associated with address $ADDR_1$ is output by the control word memory and placed on output line 50 of FIG. 4. However, control word $CW_1$ will not be accepted as an input by the frequency synthesizer until it receives the rising edge of the strobe signal, indicating that valid data is on line 50.

The comparator 46 tests the control word $CW_1$ against the prior control word (control word $CW_0$) that was previously stored in data latch 44. For illustrative purposes, it is assumed that the control word $CW_1$ (addressed by memory address $ADDR_1$) is equal to the control word $CW_0$ (addressed by memory address $ADDR_0$). The comparator, finding control word $CW_0$ equal to control word $CW_1$, outputs a logical one on line 54 to the D input of the flip-flop 48, just after time $t_3$. The logical one is latched into flip-flop 48 by the rising edge of the comparator latch control signal, shown at $t_4$. The comparator latch control signal is set high at a time interval ($t_c$) following each falling edge of the STROBE signal, and is set low at the rising edge of the STROBE signal. The flip-flop 48 thereby outputs a logical one (at Q) to the exclusive-OR gates 42, causing a modification of the code word $PN_1$. The logical one output will remain until the flip-flop 48 is cleared by the falling edge of the STROBE, illustrated by the CLEAR signal.

The modified PN code word is assumed to correspond to address $ADDR_2$, shown at $t_5$, which contains control word $CW_2$. Thus, at $t_6$, the frequency control word is changed to $CW_2$. Sometime after the repeat avoidance circuit has finished its comparison, the STROBE signal is set high (shown at $t_7$), indicating that data on line 50 is valid. Data is then transmitted at the carrier frequency indicated by control word $CW_2$. The setting of the STROBE signal also causes the control word $CW_2$ to be loaded into data latch 44.

The timing of the strobe signal is such that it becomes low prior to the generation of a new PN code word. The falling edge of the STROBE signal will activate the CLEAR on flip-flop 48, returning the output Q of the flip-flop to logical zero. Thereafter, a second code word $PN_2$ is generated, shown at $t_8$. Code word $PN_2$ corresponds to address $ADDR_3$ in the control word memory. The address $ADDR_3$ contains control word $CW_3$. The comparator compares the control word $CW_3$ to the control word $CW_2$, which is stored in data latch 44. Assuming the control words $CW_2$ and $CW_3$ are not equal, a logical zero remains on line 54 (D) and hence Q stays low. At $t_9$, the STROBE signal is again set high by the TOD clock, sending the control word $CW_3$ to the frequency synthesizer and causing $CW_3$ to be stored in data latch 44. Thus, the operation of the report avoidance circuit is illustrated.

It is understood that the altered PN code word may point to an address that contains the same digital control word as the unaltered PN code word. The probability of selecting the same control word is dependent upon the number of selected frequencies in relation to the size of the control word memory. Those skilled in the art will appreciate that multiple comparisons may be implemented by the repeat avoidance circuit by adding additional circuitry, thereby ensuring that two frequencies are not selected in a row. The advantages of adding additional circuitry to provide this benefit must be compared with circuit timing and other considerations, e.g., ensuring that frequency hops are made at the desired intervals.

Figure 6:
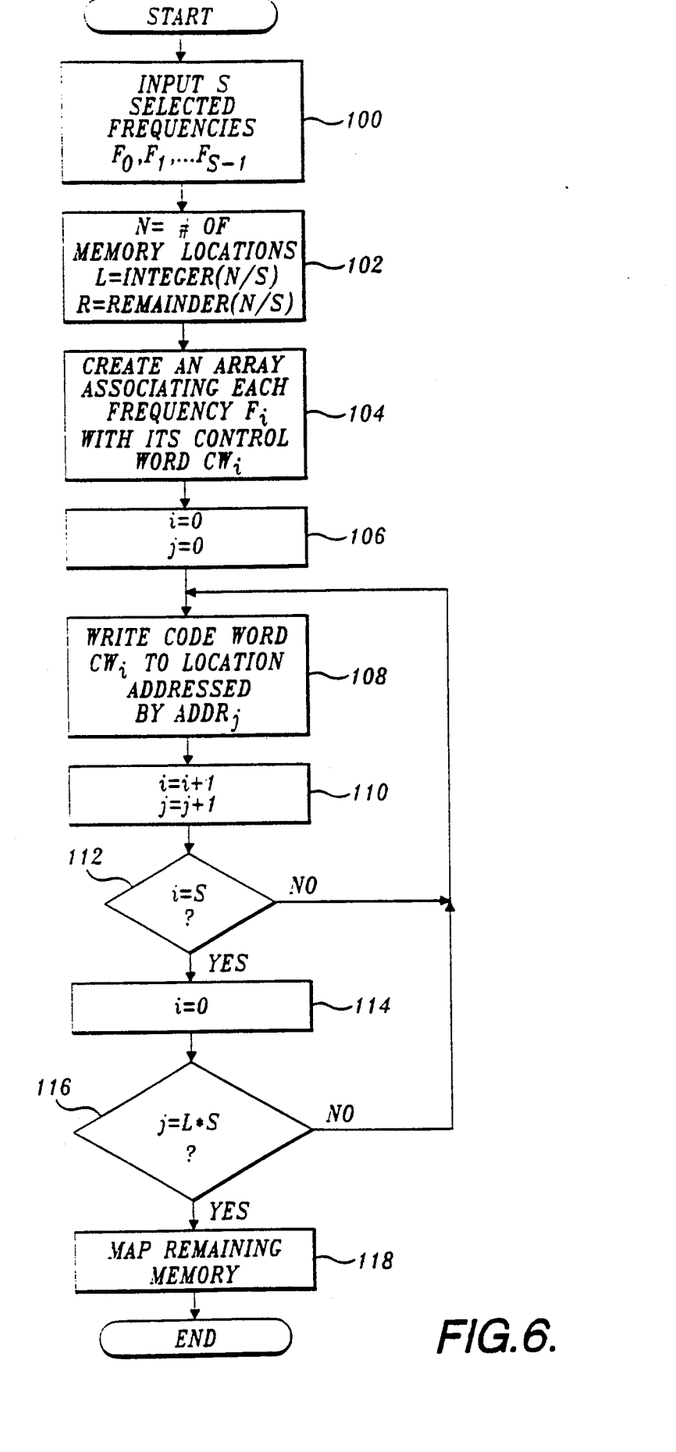
FIG. 6 is a first exemplary flow chart of a routine by which the microprocessor illustrated in FIG. 1 maps the selected frequencies into the control word memory.
Figure 8:
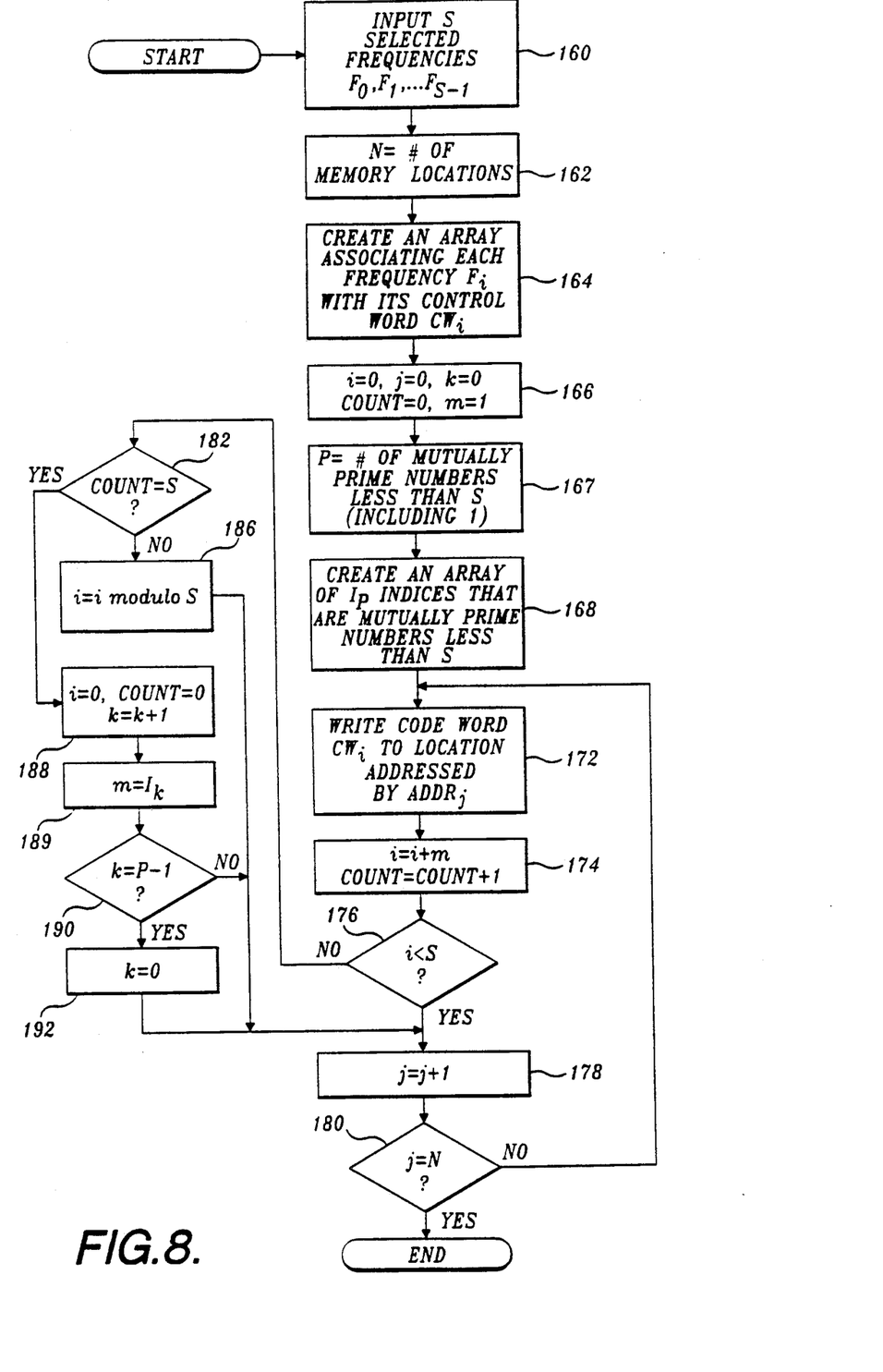
FIG. 8 is a second exemplary flow chart of a routine by which the microprocessor illustrated in FIG. 1 maps the selected frequencies into the control word memory.

FIGS. 6 and 8 disclose exemplary frequency mapping techniques to be used by the frequency mapping system (processor 12 in FIGS. 1 and 2) in mapping the control words associated with the selected frequencies into the control word memory. The control word memory is preferably a random access memory (RAM) having N locations (i.e., $2^k$, where k is the bit length of the PN code words) that are addressable by the PN code words from the PN generator.

The frequency mapping techniques provide a method for filling the N memory locations with control words from the selected frequencies, the number selected being hereby designated as S, in a relatively uniform fashion. By design, N is greater than or equal to S, thereby ensuring that each selected frequency will have its control word mapped at least once. This will provide the greatest variety in frequency variation.

For any value S less than N, the number of times L that the full set of S control words can be mapped in the control word memory is equal to the integer value of N/S. The value R is equal to the memory locations remaining after each full set of S control words has been mapped, i.e., after S has been mapped L times. The goal of the frequency mapping techniques described is to map the remaining R memory locations as uniformly as possible, i.e., such that the number of times that a control word appears differs by no more than one from the number of times that any other control word appears.

With reference to FIG. 6, at block 100, inputs are received indicating those frequencies from the frequency band of the communication system that are available for communications at any particular time, date, and geographical area. The number of selected frequencies is represented by the letter S, and each individual frequency is represented by $F_0, F_1, \ldots F_{S-1}$. At block 102, the variable N is set equal to the number of memory locations contained in the control word memory and the variable "L" is set equal to the integer value of N/S. Also, R is set equal to the number of memory locations that will remain once the full sets of S control words have been mapped. At block 104, an array is created that associates each frequency $F_i$ with its control word $CW_i$. This array corresponds to memory 14 of FIG. 1.

The counting variables i and j are initialized to zero at block 106. At block 108 the control word $CW_i$ is written to the location addressed by $ADDR_j$, where $ADDR_j$ is an address of a memory location in the control word memory. As will be appreciated, $ADDR_j$ references the full range of memory locations as j is incremented by one between zero and N-1. Counters i and j are each incremented by one at block 110. At block 112, it is determined whether the counter i is equal to S, indicating that a full set of S control words has been mapped. If i is not equal to S, the process loops back to block 108 to continue writing control words to the control word memory. If i is equal to S, the process continues at block 114 where i is reset to zero.

At block 116, it is determined whether the full sets of S control words have been mapped, i.e., whether j is equal to the value of L*S. If not, the process loops back to block 108. If j equals L*S, the full sets of S control words have been mapped and the R memory locations are remaining, where R is between one and S-1. A subroutine is called at block 118 to map the remaining memory locations as uniformly as possible. Once the remaining control word memory locations have been filled, the process is terminated. Exemplary subroutines that may be used to map the R locations are illustrated in FIGS. 7A-7C.

Figure 7A:
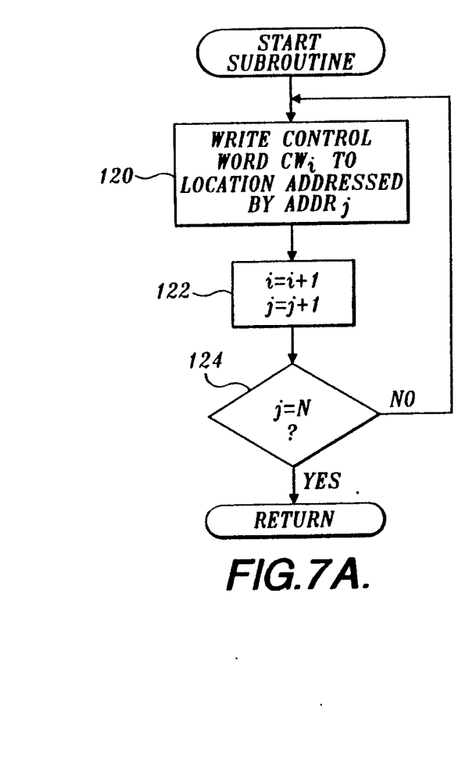
FIG. 7A is a flow chart of an exemplary subroutine in the flow diagram of FIG. 6 for mapping selected frequencies into the control word memory.

With reference to FIG. 7A, a method is provided where the remaining R locations are filled by starting with control $CW_0$ and counting upward sequentially. At block 120, the control word $CW_i$ is written to the location addressed by $ADDR_j$. At block 122, i and j are both incremented by one. At block 124, it is determined whether j is equal to N, i.e., whether the control word memory is filled. If not, the process loops back to block 120. If the control word memory is filled, the subroutine returns to the routine of FIG. 6. An advantage of the technique described in FIG. 7A is that it is straightforward. A disadvantage, however, is that lower frequencies will tend to have a higher probability of being selected than higher frequencies, the number of frequencies being repeated depending upon the values of S and N.

Figure 7B:
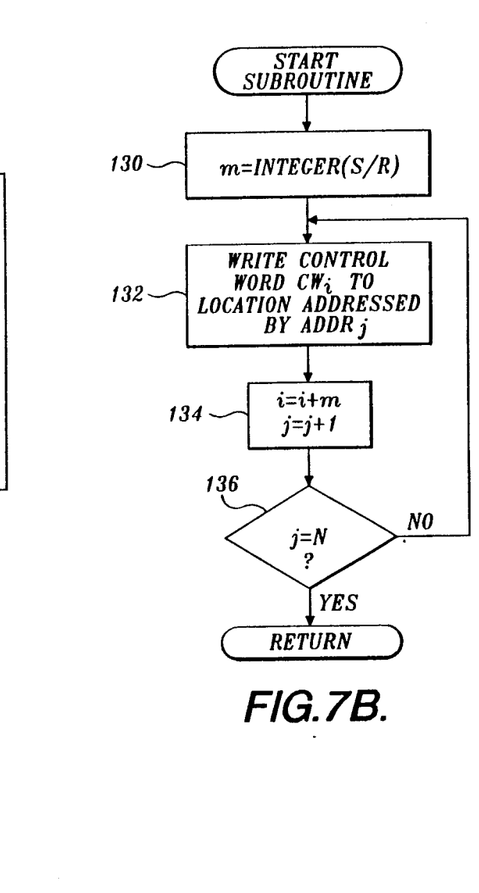
FIG. 7B is a flow chart of a second exemplary subroutine in the flow diagram of FIG. 6 for mapping selected frequencies into the control word memory.

With reference to FIG. 7B, a second exemplary embodiment of a subroutine is illustrated. At block 130, variable m is set equal to the integer of (S/R). At block 132, the control word $CW_i$ is written to the control word memory location addressed by $ADDR_j$. At block 134, i is set equal to (i+m) and j is incremented by one. At block 136, it is determined whether j is equal to N, or, in other words, whether the control word memory is fully mapped. If not, the process loops back to block 132. If the control word memory is fully mapped, the process returns to the routine of FIG. 6. The technique described in FIG. 7B will help to avoid the problem of weighting the selection of frequencies at the low end of the frequency range when the remaining R memory locations are less than or equal to S/2. For example, if R equals S/2, variable m will be set equal to two, and every other control word will be mapped until the memory is filled.

Figure 7C:
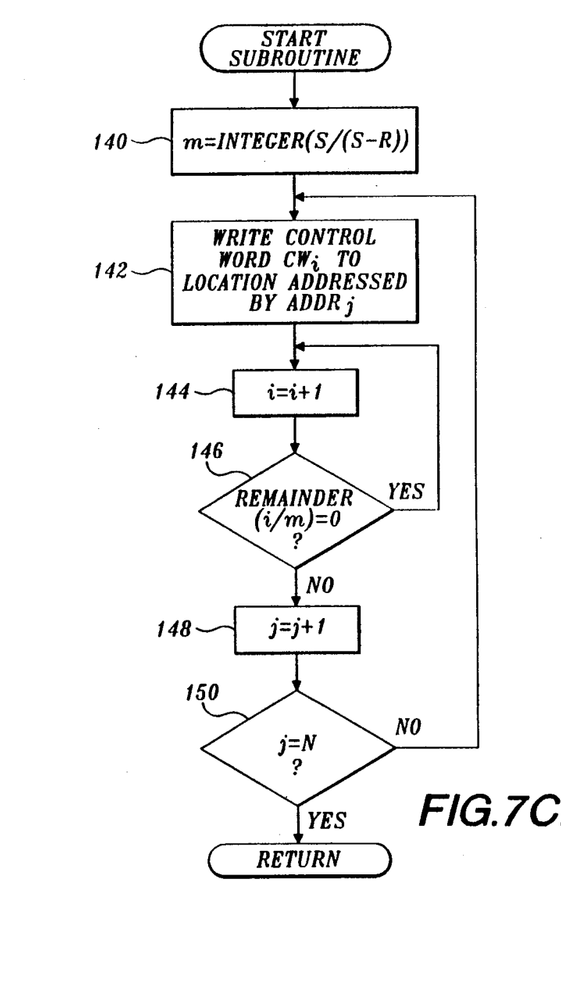
FIG. 7C is a flow chart of a third exemplary subroutine in the flow diagram of FIG. 6 for mapping selected frequencies into the control word memory.

With reference to FIG. 7C, a third exemplary embodiment of a subroutine is illustrated. Variable m is set equal to the integer of (S/(S-R)) at block 140. Variable m is set such that if every $m^{th}$ control word is skipped, the memory will still be fully mapped without having to repeat control words that are already included in the R memory locations. For example, if m is set to three, every third control word will be skipped. At block 142, the control word $CW_i$ is written to the location address by $ADDR_j$. At block 144, i is incremented by one. Block 146 determines whether the remainder of (i/m) is equal to zero, i.e., if the control word $CW_i$ should be skipped and, if so, i is incremented before writing another control word to memory (at block 144). If the remainder of (i/m) does not equal zero, control word $CW_i$ should not be skipped and the process continues to block 148 where j is incremented by one. At block 150, it is determined whether the control word memory is fully mapped by determining whether j is equal to N. If not, the process loops back to block 142. If the control word memory is fully mapped, the process returns to the routine of FIG. 6. This routine provides a more uniform frequency distribution for a wider range of values of S and N.

FIG. 8 represents a second exemplary frequency mapping technique for use by the frequency mapping system. As in the flow diagram of FIG. 6, the set of selected frequencies is again treated as an S element array. The flow diagram determines the mutually prime factors of S, and uses these as indices to increment an index i that determines which control word is mapped to an addressed location. the modulo operator is used to ensure that full sets of S control words are mapped before a new index is established. The order of the mapping will be unique for each index, i.e., each index will provide a different permutation of the S set of control words. The permutations of the S control words are then cyclically stored in the control word memory. The unique ordering of the control words is advantageous for implementing frequency repeat avoidance techniques.

At block 160, a user inputs those frequencies from the frequency band of the communication system that are available for communications at any particular time, date, and geographical area. The number of selected frequencies is represented by S, and each individual frequency is represented by $F_0, F_1, \ldots F_{S-1}$. At block 162, N is set equal to the number of memory locations contained in the control word memory. At block 164, an array is created that associates each frequency $F_i$ with its control word $CW_i$. The counting variables i, j, and k are set equal to zero in block 166. Also, variable "Count" is set equal to zero and variable m is set equal to one. Count is used to determine if a full set of S control words has been mapped.

Blocks 167 and 168 create an array $I_P$ of mutually prime numbers less than S that are to be used as indices in the flow diagram. The array extends from $I_0$ to $I_{P-1}$, where P is equal to the number of mutually prime numbers less than S. The array is created by (1) determining the prime factors of the number S and (2) storing in the array numbers from 1 to S that are not divisible by the determined prime factors. However, the numeral one is generally also used as an index. As an example, assume S=12; the prime factors of 12 are 2 and 3. The array of mutually prime numbers is thus 1, 5, 7, and 11, with P=4. As another example, if S=9, the array $I_P$ consists of 1, 2, 4, 5, 7, 8 and P=6. Use of the array $I_P$ as indices, along with the modulo operator, provides a means for storing permutations of the S control words, as described below.

At block 172, the control word $CW_i$ is written to the location addressed by $ADDR_j$, where $ADDR_j$ is equal to the address of the memory locations in the control word memory. At block 174, i is incremented to the value (i+m) and variable Count is incremented by one. At block 176, it is determined whether i is less than S. If i is less than S, the control words for the full set of S frequencies are not yet mapped. In this case, the program continues on to block 178 where j is incremented by one. At block 180, it is determined whether the control word memory is filled by comparing j to N. If the control word memory is filled, the program ends. If the control word memory is not filled, the program loops to block 172.

With reference again to block 176, if i is not less than S, this indicates that additional control words cannot be mapped with index i, because the array of control words extends between i=0 to S−1. Under this circumstance, the program continues to block 182, where it is determined whether a full set of S control words has been mapped by determining whether the variable Count is equal to S. If variable Count is not equal to S, the full set of S control words has not been mapped, and variable i is set equal (i modulo S) at block 186. Thereafter, the program loops back to block 178. If the count is equal to S, the count is reset to zero at block 188. Also, i is set equal to zero and k is incremented by one. At block 189, m is set equal to $I_k$, or, in other words, the next mutually prime number in the array of indices. At block 190, it is determined whether k is equal to the number of mutually prime factors (P) minus one. If it is not, the program loops back to block 178. If k is equal to (P−1), then the value of k is reset to zero at block 192. Thereafter, the program loops back to block 178.

As an example of the method of mapping using the flow diagram of FIG. 8, assume that S=9 and N=64. The array $I_P$ is then 1, 2, 4, 5, 7, and 8 with P=6. At the first pass through blocks 172-176, control words $CW_0-CW_8$ will be mapped into memory locations 0-8. Because a full set of S control words has been mapped, the program will advance to block 188 where m is set to the next mutually prime number, or two, and i is reset to zero. The next pass through blocks 172-176 maps $CW_0$, $CW_2$, $CW_4$, $CW_6$, $CW_8$, in memory locations 9-13, wherein the program will loop to blocks 182 and 186, setting i=i modulo S (10 modulo 9=1). The following pass through loops 172-176 maps $CW_1$, $CW_3$, $CW_5$ and $CW_7$ in memory locations 14-17. Thus, a second full set of S control words has been mapped. Continuing, m is set to 4, the next mutually prime number, at block 186. Thereafter, $CW_0$, $CW_4$, $CW_8$ are mapped in locations 18-21. At block 186, i is set to 3 (12 modulo 9), and $CW_3$, $CW_7$ are mapped. The mapping of $CW_2$ and $CW_6$, and then $CW_1$ and $CW_5$, complete the mapping of the third full set of S control words. Thus, full sets of S control words are mapped at each pass in varying order by using the $I_P$ array of indices in conjunction with the modulo function. The process continues until the memory is filled.

As will be appreciated, the flow diagrams illustrated in FIGS. 6, 7A-7C and 8 are exemplary in nature and other algorithms may be used to map the control words into the control word memory. By mapping the control words into the control word memory, the frequency mapping system provides an apparatus that avoids frequencies falling within the frequency band of a communications system while still allowing the use of a standard PN generator. Moreover, the frequency mapping system provides for a dynamic selection of available frequencies allowing a user to quickly and conveniently block out or add additional frequencies as the circumstances surrounding the ability to communicate at these frequencies change.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Apparatus for providing a sequence of digital control words to a frequency synthesizer in a frequency hopping communication system, each control word adapted to cause the frequency synthesizer to generate a carrier signal at a particular carrier signal frequency, the apparatus comprising:
   (a) a control word memory having a plurality of memory locations for storing said control words, an address input coupled to receive a prepared sequence of addresses, a data output coupled to provide control words from addressed memory locations to the frequency synthesizer, and a data input for receiving the control words to be stored in the memory locations; and
   (b) control word supply means for providing control words to the data input of the control word memory for storage in the memory locations, the control word supply means comprising:
      (i) means for receiving a selection input indicating selected carrier signal frequencies; and
      (ii) means for storing the control words corresponding to the selected carrier signal frequencies in the control word memory.

2. The apparatus of claim 1 and further including:
a frequency synthesizer having a data input coupled to the data output of the control word memory; and
pseudorandom code generation means, coupled to the address input of the control word memory, for generating the prepared sequence of addresses.

3. The apparatus of claim 2 and further including repeat avoidance means, coupled between the code generation means and the control word memory, for modifying the prepared sequence of addresses so as to diminish the probability that the same control word will be successively selected.

4. The apparatus of claim 3, wherein the repeat avoidance means includes:
   (a) storage means, coupled to the data output of the control word memory, for storing a first control word that was most recently sent to the frequency synthesizer;
   (b) a comparator having a first input to receive the first control word stored in the storage means, a second input to receive a second control word from the data output of the control word memory, the second control word being generated by the control word memory in response to an associated addresses generated by the code generation means, and an output that indicates whether the first and second control words are equal; and
   (c) means, coupled between the code generation means and the address input of the control word memory and including an input to receive the output of the comparator, for altering the associated addresses generated by the code generation means if the first and second control words are equal.

5. The apparatus of claim 1, wherein the means for storing stores the control words in such a manner that the number of times any control word appears in the control word memory can at most differ by one from the number of times any other control word appears in the control word memory.

6. The apparatus of claim 5, wherein the control word memory includes N memory locations and there are S different control words, and wherein the means for storing comprises:
   (a) means for repeatedly storing full sets of S control words in the control word memory until the number of remaining memory locations is less than S, a full set of S control words comprising one of each different control word; and
   (b) means for filling the remaining memory locations with a subset of the full set of S control words.

7. The apparatus of claim 6, wherein the means for filling the remaining memory locations comprises:
   (a) means for setting a variable m equal to the integer value of S divided by the number of remaining memory locations; and
   (b) means for storing every mth control word in the control word memory until the remaining memory locations are filled.

8. The apparatus of claim 6, wherein the number of remaining memory locations is designated as R and the means for filling the remaining memory locations comprises:
   (a) means for setting a skip variable m equal to the integer value of; and
   (b) means for storing control words in the control word memory by sequentially storing control words in the full set of S control words but skipping every mth control word, until the remaining memory locations are filled.

9. The apparatus of claim 5, wherein the control word memory includes N memory locations and there are S different control words, and wherein the means for storing comprises:
   (a) means for determining a number of permutations of the S control words; and
   (b) means for cyclically storing permutations of the S control words in the control word memory until the control word memory is filled.

10. A method of providing a sequence of digital control words to a frequency synthesizer in a frequency hopping communication system, each control word adapted to cause the frequency synthesizer to generate a carrier signal at a particular carrier signal frequency, comprising the steps of:
   (a) receiving information indicative of frequencies selected from a predetermined frequency band that are available for communications at a particular location and time;
   (b) correlating each selected frequency with its respective control word; and
   (c) storing the control words that correlate to the selected frequencies in a control word memory having a plurality of addressable locations such that each addressable location contains a control word.

11. The method of claim 10 and further including the steps of:

(d) determining a frequency hop by generating a prepared code sequence number that pinpoints a selected location in the control word memory;

(e) retrieving the control word stored in the selected location; and (f) identifying the frequency associated with the retrieved control word and producing a carrier signal at the identified frequency.

12. The method of claim 11 and further including the steps of:

(a) determining a subsequent frequency hop by generating a succeeding number in the prepared code sequence that addresses a second location in the control word memory;

(b) retrieving the control word stored in the second location;

(c) comparing the control word stored in the second location of the control word memory with the preceding control word; and (d) altering the succeeding number such that it addresses a location in the control word memory other than the second location.

13. The method of claim 10, wherein the step of storing the control words includes storing the control words in such a manner that the number of times any control word appears in the control word memory can at most differ by one from the number of times any other control word appears in the control word memory.

14. The method of claim 10, wherein the control word memory includes N addressable locations and there are S different control words, and wherein the step of storing the control words further comprises the steps of:

(a) sequentially storing full sets of S control words in the control word memory until the number of remaining addressable locations is less than S, a full set of S control words comprising one of each different control word; and (b) filling the remaining addressable locations with a subset of the full set of S control words.

15. The method of claim 14, wherein the step of filling the remaining addressable locations comprises the steps of:

(a) setting a skip variable m equal to the integer value of (S divided by the number of remaining addressable locations); and (b) storing every mth control word in the control word memory until the remaining addressable locations are filled.

16. The method of claim 10, wherein the control word memory includes N addressable locations and there are S different control words, and wherein the step of storing the control words comprises the steps of:

(a) determining a number of permutations of the S control words; and (b) cyclically storing permutations of the S control words in the control word memory until all of the addressable locations are filled.

17. The method of claim 16, wherein the set of S control words is defined as an array of control words $CW_i$, where i ranges from zero to S-1, and wherein the step of determining a permutation of the S control words includes the steps of:

(1) initializing i to zero;
(2) initializing variable count to zero;
(3) selecting a number m that is mutually prime to S and less than S; and
(4) while count is less than S;
 (a) while i is less than S;
  (i) storing control word $CW_i$ in the control word memory;
  (ii) setting i=i+m; and
  (iii) setting count+count+1; and
 (b) setting i=(i modulo S).

18. A frequency hopping communication system, comprising:

(1) a frequency synthesizer for producing a carrier signal at a frequency specified by a digital control word;

(2) code generation means for generating a prepared sequence of addresses; and (3) control means, responsive to the sequence of addresses and to a selection input indicating the carrier signal frequencies to be used, for generating a series of digital control words, the control means comprising:

(a) a control word memory having a plurality of memory locations for storing control words, an address input coupled to receive the prepared sequence of addresses from the code generation means, a data output coupled to provide control words from addressed memory locations to the frequency synthesizer, and a data input for receiving the control words to be stored in the memory locations; and (b) control word supply means for providing control words to the data input of the control word memory for storage in the memory locations, the control word supply means comprising:

(i) means for receiving the selection input indicating selected carrier signal frequencies to be generated by the frequency synthesizer; and (ii) means for providing the control words corresponding to the selected carrier signal frequencies to the control word memory.

* * * * *

UNITED STATES PATENT AND TRADEMARK OFFICE
CERTIFICATE OF CORRECTION

PATENT NO. : 5,235,613
DATED : August 10, 1993
INVENTOR(S) : D. K. Brown et al.

It is certified that error appears in the above-indentified patent and that said Letters Patent is hereby corrected as shown below:

On the title page, item [56], add the following references:

| | | | | |
|---|---|---|---|---|
| --4,394,642 | 07/19/83 | Currie et al. | 340 / 347 | |
| 4,476,566 | 10/09/84 | Dent | 375 / 001 | |
| 4,493,045 | 01/08/85 | Hughes, Jr. | 364 / 580 | |
| 4,497,020 | 01/29/85 | Gilligan | 364 / 200 | |
| 4,559,611 | 12/17/85 | Ostapko | 364 / 900 | |
| 4,606,040 | 08/12/86 | David et al. | 375 / 001 | |
| 4,606,041 | 08/12/86 | Kadin | 375 / 001 | |
| 4,653,068 | 03/24/87 | Kadin | 375 / 001 | |
| 4,688,251 | 08/18/87 | Citron et al. | 375 / 001 | |
| 4,716,573 | 12/29/87 | Bergstrom et al. | 375 / 001 | |
| 4,914,577 | 04/03/90 | Stewart et al. | 364 / 200 --. | |

Signed and Sealed this

Twenty-sixth Day of April, 1994

Attest:

BRUCE LEHMAN

*Attesting Officer*   *Commissioner of Patents and Trademarks*